United States Patent [19]
Dowen

[11] Patent Number: 6,123,182
[45] Date of Patent: *Sep. 26, 2000

[54] SELF-ADJUSTABLE BRAKE

[75] Inventor: Gordon C. Dowen, Salem, Ind.

[73] Assignee: Tecumseh Products Company, Tecumseh, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/165,904

[22] Filed: Oct. 2, 1998

[51] Int. Cl.⁷ ...................................................... F16D 11/00
[52] U.S. Cl. ........................................ 192/111 A; 192/218
[58] Field of Search ............................... 192/218, 111 A; 188/71.9

[56] References Cited

U.S. PATENT DOCUMENTS

| | | | |
|---|---|---|---|
| 3,129,789 | 4/1964 | Hodkinson | 188/72 |
| 3,243,016 | 3/1966 | Swift | 192/111 X |
| 3,545,573 | 12/1970 | Barton | 188/72.9 |
| 3,788,430 | 1/1974 | Hurt | 188/71.9 X |
| 3,820,635 | 6/1974 | Hurt | 192/111 X |
| 3,851,737 | 12/1974 | Hewins | 188/71.9 |
| 3,926,284 | 12/1975 | Iturriaga Notario | 188/196 BA |
| 4,022,299 | 5/1977 | Haraikawa | 188/71.9 |
| 4,022,300 | 5/1977 | Afanador et al. | 192/111 X |
| 4,180,146 | 12/1979 | Airheart | 188/71.9 X |
| 4,346,792 | 8/1982 | Watanabe | 188/71.9 X |
| 4,449,424 | 5/1984 | Hauser | 74/701 |
| 4,494,633 | 1/1985 | Idesawa | 188/329 |
| 4,586,589 | 5/1986 | Idesawa | 188/79.5 K |
| 4,966,574 | 10/1990 | von Kaler et al. | 475/206 |
| 5,094,121 | 3/1992 | von Kaler | 74/475 |
| 5,184,701 | 2/1993 | Mamery | 188/79.55 |
| 5,195,386 | 3/1993 | Havens et al. | 74/411.5 |
| 5,211,067 | 5/1993 | von Kaler | 74/371 |
| 5,392,603 | 2/1995 | Havens et al. | 60/327 |
| 5,918,709 | 7/1999 | von Kater | 188/196 B |

*Primary Examiner*—Khoi Q. Ta
*Attorney, Agent, or Firm*—Baker & Daniels

[57] ABSTRACT

A transaxle including a self-adjusting brake mechanism. The transaxle includes a housing and a speed reduction mechanism including a plurality of interconnected shafts rotatably disposed in the housing. A brake assembly is mounted on the housing for applying braking force to one of the shafts, the braking mechanism including a threaded mounting member and a brake lever having an opening rotatably disposed around the threaded member. An adjustment nut is threadedly disposed on the mounting member and has a portion thereof disposed within the brake lever opening, the adjustment nut operable when rotated in a given direction to adjust the brake to compensate for wear. The brake lever opening has a pawl that cooperates with a plurality of ratchet teeth on the adjustment nut to adjust the brake mechanism for wear.

26 Claims, 3 Drawing Sheets

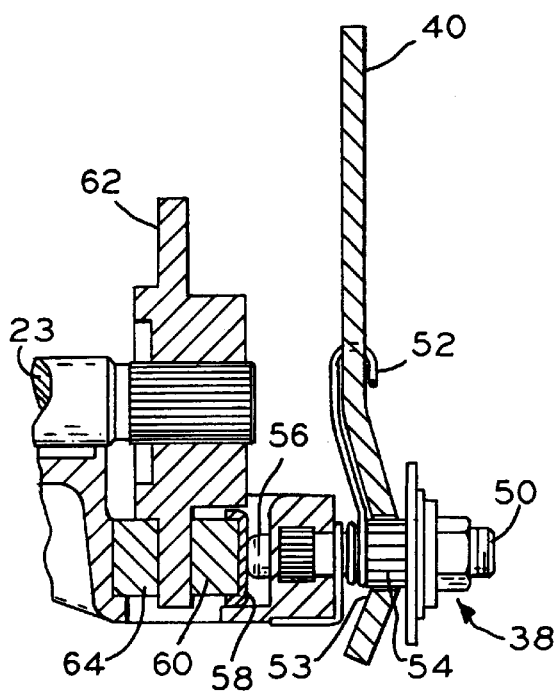
FIG_2
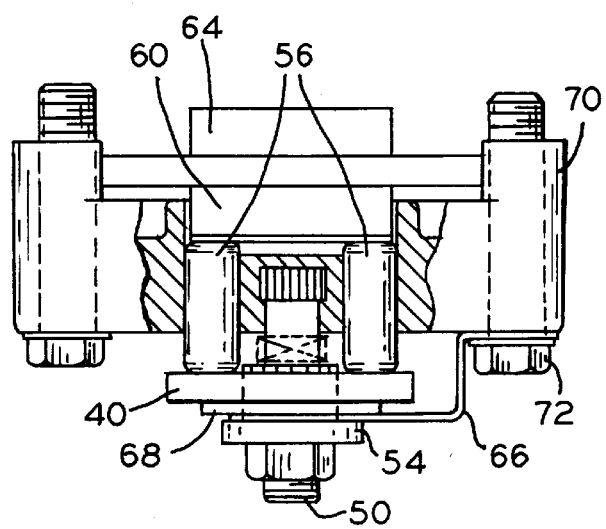
FIG_3
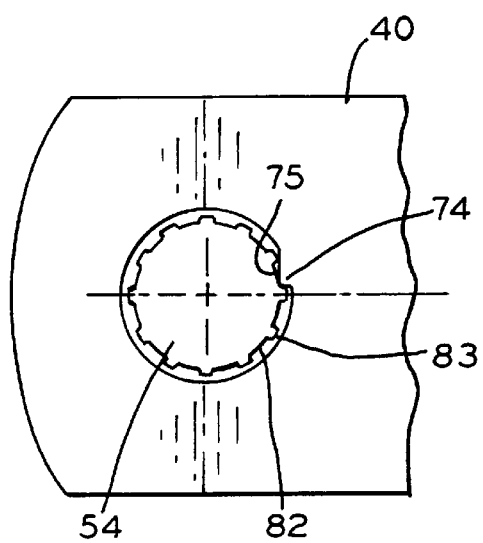
FIG_4
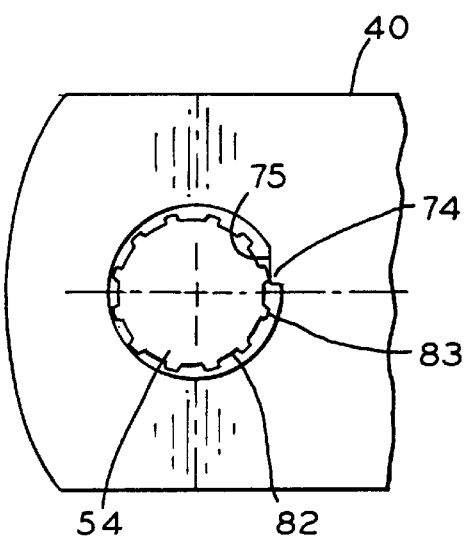
FIG_5

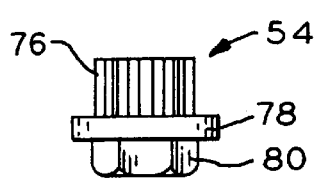
FIG_6
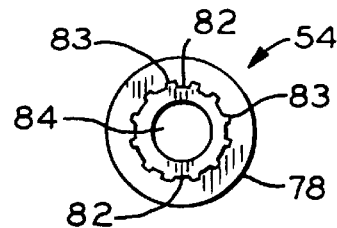
FIG_7
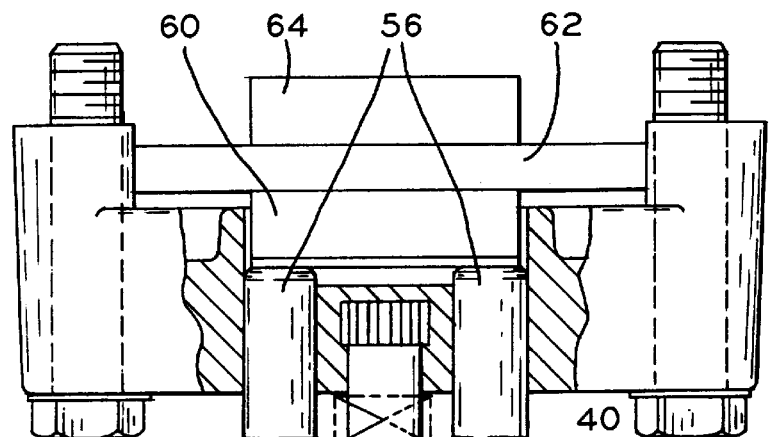
FIG_8
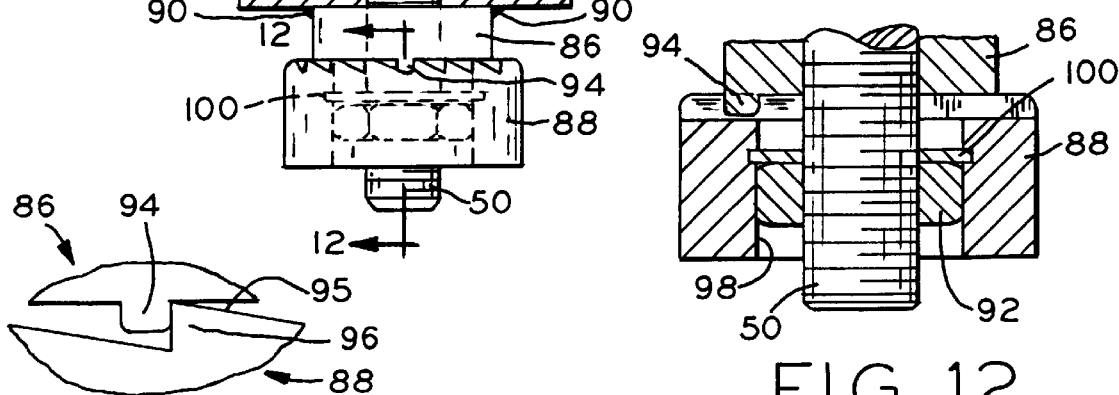
FIG_9    FIG_12
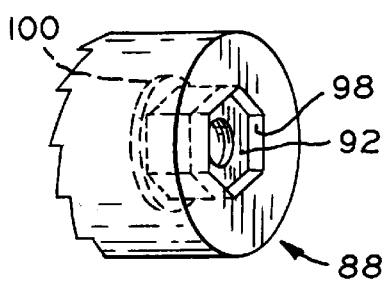
FIG_10
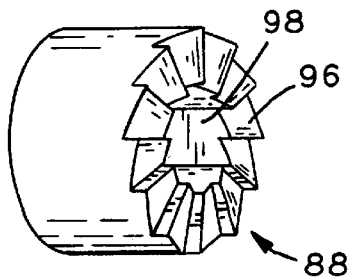
FIG_11

SELF-ADJUSTABLE BRAKE

BACKGROUND OF THE INVENTION

The present invention relates to brake systems of small transmissions and transaxles for riding lawn mowers, garden tractors, and the like. More specifically, the field of the invention is that of self-adjusting brakes for such small transmissions and transaxles.

Prior art self-adjusting brake systems have utilized the general concept of a ratcheting mechanism for automatic adjustment to compensate for brake wear. The ratcheting mechanisms generally consist of a spring-controlled brake lever with ratchet cogs which engage with the teeth of a wheel fixed to a shaft. With successive wear of the braking system, the ratchet cogs engage in new teeth, causing rotation of the wheel, and adjustment of the braking system inward to compensate for wear. The ratcheting systems in the prior art also include a multitude of specialized, custom parts to accomplish the self-adjusting braking capability.

A self-adjusting brake system for small transmissions such as those used on lawn tractors, garden tractors, and the like is needed to reduce the amount of periodic adjustments required to the brake system. In addition, a self-adjusting brake system which eliminates the need for expensive custom parts, and which uses existing hardware, is needed to allow for a simple, cost-effective improvement to existing brake systems.

SUMMARY OF THE INVENTION

The present invention is a self-adjusting brake system which utilizes an extremely simple ratcheting mechanism in combination with an existing brake lever, which is operably connected to the shift shaft, or other shaft or axle of a transaxle. The ratcheting mechanism consists of a nut with external teeth and grooves which contact the brake lever. A hole in the lower portion of the brake lever contains a pawl which contacts the external teeth of the nut, and engages successive teeth with progressive wear of the brakes. As the brakes are worn, and the pawl engages in successive teeth, the braking system is adjusted inward, thus eliminating the need for periodic brake adjustment over time.

The self-adjusting brake system uses existing hardware of transaxle braking systems, and requires the addition of minimal modified standard parts to achieve the ratcheting action. The self-adjusting brake system prolongs the uninterrupted use of the braking system without adjustments thereof.

BRIEF DESCRIPTION OF THE DRAWINGS

FIG. 2 is a sectioned view of the brake system of the present invention;

FIG. 3 is a top view, partially in section, of the brake system of the present invention;

FIG. 4 is an enlarged view of the brake lever catch engaged with the ratchet nut of the present invention when the brake lever is actuated;

FIG. 5 is an enlarged view of the brake lever catch progressing to the next position of the ratchet nut of the present invention when the brake lever is released;

FIG. 6 is a side view of the ratchet nut of the present invention;

FIG. 7 is an end view of the ratchet nut of the present invention;

FIG. 8 is a top view, partially in section, of a second embodiment of the present invention;

FIG. 9 is an enlarged fragmentary side view of the brake lever lug engaged with the ratchet pawl of the second embodiment of the present invention when the brake lever is actuated;

FIG. 10 is a perspective view of the front of the ratchet block of the second embodiment of the present invention;

FIG. 11 is a perspective view of the rear of the ratchet block of the second embodiment of the present invention; and FIG. 12 is an enlarged section view of the adjuster block and ratchet block located on the mounting bolt of the second embodiment of the present invention.

DETAILED DESCRIPTION

Figure 1:
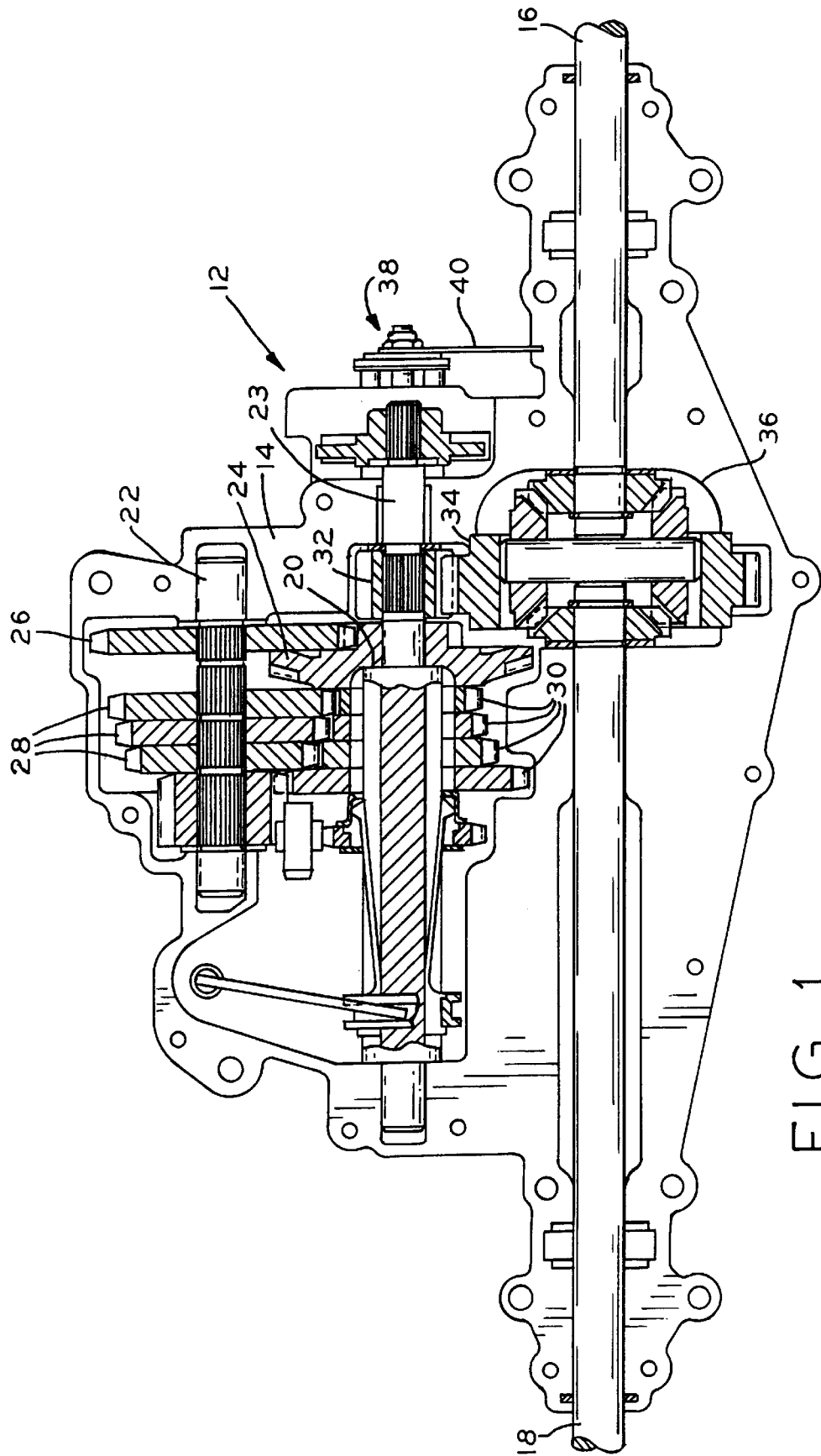
FIG. 1 is a top view, in partial cross-section, of one embodiment of the transmission of the present invention.

Referring first to FIG. 1, transaxle 12, as disclosed in U.S. Pat. No. 4,966,574, the disclosure of which is explicitly incorporated, comprises a lower housing 14 with an upper housing (not shown), said housings supporting axles 16 and 18, on which wheels (not shown) are mounted. The transaxle 12 comprises a speed reduction mechanism including shift shaft 20, counter shaft 22, and brake shaft 23. Bevel gear 24 is turned by an input shaft (not shown) and engages gear 26 of counter shaft 22. Companion gears 28 of counter shaft 20 engage spur gears 30 of shift shaft 20 so that gear 32 of shift shaft 20 drives ring gear 34 of differential 36 thus turning axles 16 and 18. The vehicle is slowed or stopped by brake assembly 38 through action of brake lever 40, applying braking torque to brake shaft 23. Alternatively, the transaxle 12 could be of a conventional hydrostatic design, such as disclosed in U.S. Pat. No. 5,392,603, which is expressly incorporated by reference.

Referring now to FIGS. 2 and 3, one embodiment of the present invention includes brake lever 40 connected to brake assembly 38 on mounting bolt 50 and held in position by torsion spring 52 and ratchet nut 54. Brake pins 56 are in contact with cam surface 53 of brake lever 40 at their outer end, and are in contact with plate 58 at their inner end. Plate 58 is in contact with outer brake pad 60. Inner and outer brake pads 60 and 64 surround brake disc 62, and brake disc 62 is splined to brake shaft 23. Mounting bolt 50 is fixed to brake housing 70.

Upon rotation of brake lever 40 about mounting bolt 50, cam surface 53 engages brake pins 56 and thereby presses outer brake pad 60 inwardly towards brake disc 62. A slight end play permits brake disc 62 to move into inner brake pad 64 such that brake disc 62 is in effect squeezed between brake pads 60 and 64 upon movement of brake lever 40. Pressing of brake pads 60 and 64 against brake disc 62 causes slowing or stopping of brake disc 62 and brake shaft 23, resulting in subsequent slowing or stopping of axles 16 and 18 and the mounted wheels (not shown).

Referring now to FIG. 3, ratchet nut 54 is positioned on mounting bolt 50 against anti-rotation bracket 66, thrust washer 68, and brake lever 40. Anti-rotation bracket 66 is located adjacent to ratchet nut 54 and prevents ratchet nut 54 from backing off during operation through attachment to brake housing 70 by bolt 72. Thrust washer 68 is located adjacent to anti-rotation bracket 66 and provides a larger, evenly distributed pressure upon tightening of ratchet nut 54.

As shown in FIGS. 4 and 5, brake lever 40 includes a unidirectional pawl 74, and ratchet nut 54 includes preferably twelve (12), but possibly eight (8) grooves 82, forming teeth 83. FIG. 4 shows engagement of pawl 74 of brake lever 40 with teeth 83 of ratchet nut 54 during application of braking force, or clockwise rotation of brake lever 40. FIG. 5 shows progression of pawl 74 of brake lever 40 past teeth 83 of ratchet nut 54, progressing to the next successive groove 82 of ratchet nut 54 when braking force is released, or counterclockwise rotation of brake lever 40. Clockwise rotation of brake lever 40 induces contact between pawl 74 and teeth 83 of ratchet nut 54, causing ratchet nut 54 to turn with the clockwise rotation of brake lever 40. Turning of ratchet nut 54 with clockwise rotation of brake lever 40 causes inward movement of ratchet nut 54, thrust washer 68, and subsequently brake lever 40. As lever 40 is released, or rotated counterclockwise, ratchet nut 54 stays in place. As the brakes are worn and increased inward movement of surface 53 is required to apply the necessary braking force, the cam surface 75 of pawl 74 rides over the next tooth 83 to the next successive groove 82 in ratchet nut 54, thus providing the necessary inward movement of surface 53 of brake lever 40 on the next brake stroke, resulting in self-adjusting braking. Alternatively, brake lever 40 could include the grooves 82 and teeth 83, and ratchet nut 54 could include the pawl 74, to provide the required ratcheting action.

Ratchet nut 54 is shown in detail in FIGS. 6 and 7, having shaft 76, collar 78, head 80, grooves 82, teeth 83, and threaded inner bore 84. Shaft 76 comprises grooves 82 and teeth 83 which interact with pawl 74 of brake lever 40. Collar 78 provides clamp-up pressure to adjust the position of brake lever 40 inward when ratchet nut 54 is rotated by brake lever 40. Head 80 and threaded inner bore 84 are used for installation and removal of ratchet nut 54 over mounting bolt 50.

A second embodiment of the present invention is shown in FIGS. 8 and 12, which comprises adjuster block 86 attached to brake lever 40 at fixed connection 90, ratchet block 88, retaining snap ring 100 and threaded locknut 92. Adjuster block 86 is joined at fixed connection 90, for example by welding, with brake lever 40 such that movement of brake lever 40 causes simultaneous movement of adjuster block 86.

Ratchet block 88 is detailed in FIGS. 10 and 11, and comprises nut recess 98, ratchet pawls 96, and a retaining ring groove. Nut recess 98 is shaped to mate with locknut 92, such that rotation of ratchet block 88 causes contact between nut recess 98 and locknut 92, thereby turning locknut 92 simultaneously with ratchet block 88. Retaining ring 100 provides positioning of ratchet block 88 along mounting bolt 50 with rotation of ratchet block 88.

As shown in FIGS. 8, 9, and 12, when brake lever 40 is rotated clockwise, adjuster block 86 moves simultaneously with brake lever 40 due to fixed connection 90, and pawl or lug 94 of adjuster block 86 engages a ratchet tooth 96 of ratchet block 88, turning ratchet block 88 and locknut 92. Clockwise rotation of ratchet block 88 and locknut 92 then causes inward movement of adjuster block 86 and brake lever 40 along mounting bolt 50. As brake lever 40 is released or rotated counterclockwise, ratchet block 88 and locknut 92 stay in place. As the brakes are worn and increased inward movement is required, lug 94 of adjuster block 86 rides over cam surface 95 and moves past the next successive ratchet tooth 96 in ratchet block 88 when brake lever 40 is released, or rotated counterclockwise, thus rotating ratchet block 88 clockwise on the next brake engagement and adjusting surface 53 of brake lever 40 inward to provide the necessary braking force.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:

a housing;

a speed reduction mechanism including a plurality of interconnected shafts rotatably disposed in said housing;

a brake assembly mounted on said housing for applying braking force to one of said shafts, said brake assembly including a threaded mounting member and a brake lever having an opening rotatably disposed around said threaded mounting member;

said brake assembly further comprising an adjustment mechanism including an adjustment nut threadedly disposed on said mounting member and having a portion thereof disposed within said lever opening; said adjustment nut operable when rotated in a given direction to adjust the braking means to compensate for wear;

one of said adjustment nut portion and said lever opening having a plurality of ratchet teeth thereon and the other of said adjustment nut portion and said lever opening having a unidirectional pawl cooperating with said ratchet teeth, whereby rotation of said brake lever to engage said pawl and a ratchet tooth rotates said adjustment nut in the given direction to thereby compensate for brake wear.

2. The transmission of claim 1 wherein said ratchet teeth are on said adjustment nut and said pawl is on said lever.

3. The transmission of claim 2 including a return spring acting on said lever to return said lever to a rest position when released, said pawl including a cam surface adapted to ride over said teeth when said lever is released.

4. The transmission of claim 1 including at least eight said ratchet teeth.

5. The transmission of claim 1 including at least twelve said ratchet teeth.

6. The transmission of claim 1 including an anti-rotation bracket disposed intermediate said lever and said adjustment nut.

7. The transmission of claim 1 wherein said ratchet teeth are on said adjustment nut and said pawl is on said lever, and said pawl is integral with said lever and includes a cam surface adapted to ride over said teeth in one direction of movement.

8. A transmission comprising:

a housing;

a speed reduction mechanism including a plurality of interconnected shafts rotatably disposed in said housing;

a brake assembly mounted on said housing comprising:
a disc fixed to one of said shafts;
a pair of friction pads that frictionally engage said disc;
a threaded mounting member extending parallel to an axis of said one shaft;
a brake lever having an opening therein that is disposed around said threaded mounting member and a cam surface on one side of said lever that presses said friction pads together when said lever is rotated; and an adjustment nut threadedly disposed on said mounting member and having a first portion disposed within said brake lever opening and a radially extending portion adjacent the other side of said brake lever to retain said brake lever toward said brake pads, said adjustment nut operable when rotated in a given direction to draw the brake lever toward the brake pads;

one of said adjustment nut first portion and said lever opening having a plurality of ratchet teeth thereon and the other of said adjustment nut first portion and said lever opening having a pawl thereon cooperating with said ratchet teeth, whereby rotation of said brake lever to engage said pawl and a ratchet tooth rotates said adjustment nut in the given direction to thereby compensate for brake wear.

9. The transmission of claim 8, wherein said ratchet teeth are on said adjustment nut and said pawl is on said lever.

10. The transmission of claim 9 including a return spring acting on said lever to return said lever to a rest position when released, said pawl including a cam surface adapted to ride over said teeth when said lever is released.

11. The transmission of claim 9, wherein said ratchet teeth are on said adjustment nut and said pawl is on said lever, and said pawl is integral with said lever and includes a cam surface adapted to ride over said teeth in one direction of movement.

12. A transmission comprising:
a housing;
a speed reduction mechanism including a plurality of interconnected shafts rotatably disposed in said housing;
a brake assembly mounted on said housing for applying braking force to one of said shafts, said brake assembly including a threaded mounting member and a brake lever having an opening rotatably disposed around said mounting member; and
an adjustment mechanism including an adjustment nut device threadedly disposed on said mounting member, said adjustment nut device operable when rotated in a given direction to extend in an axial direction on said mounting member to adjust the brake assembly to compensate for wear;
one of said adjustment nut device and said brake lever including a plurality of ratchet teeth extending parallel to the axial direction and the other of said adjustment nut device and said brake lever including a pawl extending parallel to the axial direction and engageable with said ratchet teeth in a facing manner, whereby rotating said brake lever to engage said pawl and a ratchet tooth rotates said adjustment nut device in the given direction to thereby compensate for brake wear.

13. The transmission of claim 12 including a return spring acting on said lever to return said lever to a rest position when released, said pawl including a cam surface adapted to ride over said teeth when said lever is released.

14. The transmission of claim 12, wherein said ratchet teeth are on said adjustment nut device and said pawl is on said lever.

15. The transmission of claim 12 including at least eight said ratchet teeth.

16. The transmission of claim 12 including at least twelve said ratchet teeth.

17. A transmission comprising:
a housing;
a speed reduction mechanism including a plurality of interconnected shafts rotatably disposed in said housing;
a brake assembly mounted on said housing comprising:
a disc fixed to one of said shafts;
a pair of friction pads that frictionally engage said disc;
a threaded mounting member extending parallel to an axis of said one shaft;
a brake lever having an opening therein that is disposed around said threaded mounting member and a cam surface on one side of said lever that presses said brake pads together when said lever is rotated; and
an adjustment nut device threadedly disposed on said mounting member and having a radially extending portion adjacent the other side of said brake lever to retain said brake lever toward said brake pads, said adjustment nut device operable when rotated in a given direction to draw said brake lever toward said friction pads;
one of said adjustment nut device and said brake lever including a plurality of ratchet teeth extending parallel to the axial direction and the other of said adjustment nut device and said brake lever including a pawl extending parallel to the axial direction and engageable with said ratchet teeth, whereby rotating said brake lever to engage said pawl and a ratchet tooth rotates said adjustment nut device in the given direction to thereby compensate for brake wear.

18. The transmission of claim 18 wherein said ratchet teeth are on said adjustment nut device and said pawl is on said brake lever.

19. The transmission of claim 19 including a return spring acting on said lever to return said lever to a rest position when released, said pawl including a cam surface adapted to ride over said teeth when said lever is released.

20. A transmission comprising:
a housing;
a speed reduction mechanism including a plurality of interconnected shafts rotatably disposed in said housing;
a brake assembly mounted on said housing for applying braking force to one of said shafts, said brake assembly including a threaded mounting member and a brake lever having an opening rotatably disposed around said threaded mounting member;
said brake assembly further comprising an adjustment mechanism including an adjustment nut threadedly disposed on said mounting member and having a portion thereof disposed within said lever opening; said adjustment nut operable when rotated in a given direction to adjust said braking assembly to compensate for brake wear;
one of said adjustment nut portion and said lever opening having a plurality of ratchet teeth thereon and the other of said adjustment nut portion and said lever opening having a unidirectional pawl cooperating with said ratchet teeth, whereby rotation of said brake lever to engage said pawl and one of said ratchet teeth rotates said adjustment nut in a given direction to thereby compensate for brake wear.

21. The transaxle of claim 20 wherein said ratchet teeth are on said adjustment nut and said pawl is on said brake lever.

22. A transaxle comprising:
a housing;
a speed reduction mechanism including a plurality of interconnected shafts rotatably disposed in said housing;
a brake assembly mounted on said housing comprising:

a disc fixed to one of said shafts;

a pair of brake pads that frictionally engage said disc;

a threaded mounting member extending parallel to an axis of said one shaft;

a brake lever having an opening therein that is disposed around said threaded mounting member and a cam surface on one side of said brake lever that presses said brake pads together when said lever is rotated; and an adjustment nut device threadedly disposed on said mounting member and having a first portion disposed within said brake lever opening and a radially extending portion adjacent the other side of said brake lever to retain said brake lever toward said brake pads, said adjustment nut operable when rotated in a given direction to draw the brake lever toward the brake pads;

one of said adjustment nut first portion and said brake lever opening having a plurality of ratchet teeth thereon and the other of said adjustment nut first portion said brake lever opening having a pawl thereon cooperating with said ratchet teeth, whereby rotation of said brake lever to engage said pawl and one of said ratchet teeth rotates said adjustment nut in the given direction to thereby compensate for brake wear.

23. The transaxle of claim 22 wherein said ratchet teeth are on said adjustment nut and said pawl is on said brake lever.

24. A transaxle comprising:

a housing;

a speed reduction mechanism including a plurality of interconnected shafts rotatably disposed in said housing;

a brake assembly mounted on said housing for applying braking force to one of said shafts, said brake assembly including a threaded mounting member and a brake lever having an opening rotatably disposed around said mounting member; and an adjustment mechanism including an adjustment nut device threadedly disposed on said mounting member, said adjustment nut device operable when rotated in a given direction to extend in an axial direction on said mounting member to adjust the brake assembly to compensate for brake wear;

one of said adjustment nut device and said brake lever including a plurality of ratchet teeth extending parallel to the axial direction and the other of said adjustment nut device and said brake lever including a pawl extending parallel to the axial direction and engageable with said ratchet teeth in a facing manner, whereby rotating said brake lever to engage said pawl and one of said ratchet teeth rotates said adjustment nut device in the given direction to thereby compensate for brake wear.

25. The transaxle of claim 24, wherein said ratchet teeth are on said adjustment nut device and said pawl is on said brake lever.

26. A transaxle comprising:

a housing;

a speed reduction mechanism including a plurality of interconnected shafts rotatably disposed in said housing;

a brake assembly mounted on said housing comprising:

a disc fixed to one of said shafts;

a pair of brake pads that frictionally engage said disc;

a threaded mounting member extending parallel to an axis of said one shaft;

a brake lever having an opening therein that is disposed around said threaded mounting member and a cam surface on one side of said lever that presses said brake pads together when said lever is rotated; and an adjustment nut device threadedly disposed on said mounting member and having a radially extending portion adjacent the other side of said brake lever to retain said brake lever toward said brake pads, said adjustment nut device operable when rotated in a given direction to draw said brake lever toward said brake pads;

one of said adjustment nut device and said brake lever including a plurality of ratchet teeth extending parallel to the axial direction and the other of said adjustment nut device and said brake lever including a pawl extending parallel to the axial direction and engageable with said ratchet teeth in a facing manner, whereby rotating said brake lever to engage said pawl and one of said ratchet teeth rotates said adjustment nut device in the given direction to thereby compensate for brake wear.

\* \* \* \* \*

UNITED STATES PATENT AND TRADEMARK OFFICE
CERTIFICATE OF CORRECTION

PATENT NO.   : 6,123,182
DATED        : September 26, 2000
INVENTOR(S)  : Gordon C. Dowen It is certified that error appears in the above-identified patent and that said Letters Patent is hereby corrected as shown below:

Column 4, claim 1,
Line 25, delete "the braking means" and substitute therefore -- said brake assembly --
Line 32, delete "a ratchet tooth" and substitute therefore -- one of said ratchet teeth --

Column 4, claim 2,
Line 36, before "lever" insert -- brake --.

Column 4, claim 3,
Line 37, after "claim 2" insert -- , further --;
Line 38, before "lever" both occurrences insert -- brake --;
Line 40, before "teeth" insert -- ratchet --; and
Line 40, before "lever" insert -- brake --.

Column 4, claim 4,
Line 41, delete "including" and substitute therefor -- , wherein said adjustment nut includes --.

Column 4, claim 5,
Line 43, delete "including" and substitute therefor -- , wherein said adjustment nut includes --.

Column 4, claim 7,
Line 50, before "lever" insert -- brake --;
Line 51, before "lever" insert -- brake --; and
Line 52, before "teeth" insert -- ratchet --.

Column 4, claim 8,
Line 61, delete "friction" and substitute therefor -- brake --;
Line 65, before "lever" insert -- brake --;
Line 66, delete "friction" and substitute therefor --brake
Line 66, before "lever" insert -- brake --;

Column 5, claim 8,
Line 9, before "lever" insert --brake--;
Line 12, before "lever" insert --brake--; and
Line 13, delete "a ratchet tooth" and substitute therefor -- one of said ratchet teeth --.

UNITED STATES PATENT AND TRADEMARK OFFICE
CERTIFICATE OF CORRECTION

PATENT NO.   : 6,123,182
DATED        : September 26, 2000
INVENTOR(S)  : Gordon C. Dowen It is certified that error appears in the above-identified patent and that said Letters Patent is hereby corrected as shown below:

Column 5, claim 9,
Line 18, before "lever" insert --brake--.

Column 5, claim 10,
Line 20, before "lever" both occurrences insert -- brake --;
Line 22, before "teeth" insert -- ratchet --; and "
Line 22, before "lever" insert -- brake --.

Column 5, claim 11,
Line 24, before "lever" insert -- brake --.
Line 25, before "lever" insert -- brake --; and
Line 26, before "teeth" insert -- ratchet --.

Column 5, claim 12,
Line 43, before "wear" insert -- brake --; and
Line 49, delete "a ratchet tooth" and substitute therefor -- one of said ratchet teeth --.

Column 5, claim 13,
Line 52, before "lever" both occurrences insert -- brake --;
Line 54, before "teeth" insert -- ratchet --; and
Line 54, before "lever" insert -- brake --.

Column 5, claim 14,
Line 57, before "lever" insert -- brake --.

Column 5, claim 15,
Line 58, delete "including" and substitute therefor -- , wherein said adjustment nut device includes --.

Column 5, claim 16,
Line 60, delete "including" and substitute therefor -- , wherein said adjustment nut device includes --.

UNITED STATES PATENT AND TRADEMARK OFFICE
CERTIFICATE OF CORRECTION

PATENT NO. : 6,123,182
DATED : September 26, 2000
INVENTOR(S) : Gordon C. Dowen

It is certified that error appears in the above-identified patent and that said Letters Patent is hereby corrected as shown below:

Column 6, claim 17,
Line 3, delete "friction" and substitute therefor -- brake --;
Line 16, delete "friction" and substitute therefor -- brake --;
Line 22, after "teeth" insert -- in a facing manner --;
Lines 23-24, delete "a ratchet tooth" and substitute therefor -- one of said ratchet teeth --.

Column 6, claim 18,
Line 26, delete "18" and substitute therefor -- 17 --.

Column 6, claim 19,
Line 29, delete "19" and substitute therefor -- 18 --;
Line 29, delete "return" and substitute therefor -- torsion --;
Line 30, before "lever" both occurrences insert -- brake --;
Line 32, before "teeth" insert -- ratchet --; and
Line 32, before "lever" insert -- brake --.

Signed and Sealed this

Eighteenth Day of December, 2001

Attest:

JAMES E. ROGAN
*Attesting Officer*  *Director of the United States Patent and Trademark Office*